United States Patent [19]

Kompelien

[11] 4,283,638
[45] Aug. 11, 1981

[54] FIELD EFFECT TRANSISTOR SWITCHED TEMPERATURE CONTROL CIRCUIT

[75] Inventor: Arlon D. Kompelien, Richfield, Minn.

[73] Assignee: Honeywell Inc., Minneapolis, Minn.

[21] Appl. No.: 59,810

[22] Filed: Jul. 23, 1979

[51] Int. Cl.³ ........................................ H03K 17/687
[52] U.S. Cl. .................................. 307/580; 307/117; 307/310; 307/584; 328/3
[58] Field of Search ............... 307/251, 304, 310, 117; 328/3

[56] References Cited

U.S. PATENT DOCUMENTS

| | | | |
|---|---|---|---|
| 3,372,328 | 3/1968 | Pinckaers | 323/22 |
| 3,833,859 | 9/1974 | Carlson | 328/3 X |
| 3,948,441 | 4/1976 | Perkins et al. | 307/66 X |
| 4,148,046 | 4/1979 | Hendrickson et al. | 357/23 |
| 4,148,047 | 4/1979 | Hendrickson | 357/23 |
| 4,152,714 | 5/1979 | Hendrickson et al. | 357/23 |

*Primary Examiner*—Eugene La Roche
*Attorney, Agent, or Firm*—Alfred N. Feldman

[57] ABSTRACT

Two field effect transistor device means are utilized in conjunction with a special type of transformer having a low impedance primary winding and a high impedance primary winding to energize a secondary circuit to supply power for operating the electronics. The energy storage means for the field effect transistor device means is kept charged either directly from the line or through a voltage in the primary windings of the special transformer when the load switching field effect transistor device means is conducting.

10 Claims, 2 Drawing Figures

FIELD EFFECT TRANSISTOR SWITCHED TEMPERATURE CONTROL CIRCUIT

REFERENCE TO CO-PENDING APPLICATION

Reference is hereby made to a co-pending application by Arlon D. Kompelien entitled Field Effect Transistor Device Means Control System having a Ser. No. 053,870 filed on July 2, 1979 which is assigned to the assignee of the present application. The co-pending application discloses a general application of a control system for field effect transistor device means.

BACKGROUND OF THE INVENTION

Recently a new type of semiconductor device that is capable of switching significant amounts of electric energy has become known. This device is a form of bilateral insulated gate field effect transistor. The device has a relatively low resistance drop to current flowing through the device, and the device is capable of bilateral current flow. The device is further capable of being switched from a conductive to a non-conductive, or a non-conductive to a conductive state by low power with the application of relatively low voltages. This type of device is shown in, for example, U.S. Pat. No. 4,148,046 issued on Apr. 3, 1979 to Hendrickson et al, U.S. Pat. No. 4,148,047 issued on Apr. 3, 1979 to Hendrickson, and in U.S. Pat. No. 4,152,714 to Hendrickson et al, issued on May 1, 1979.

The mode of switching the bilateral insulated gate field effect transistor centers on effectively short circuiting the gate of the insulated field effect transistor to the substrate of the device in order to turn the device completely off. The application of a potential to the gate which is greater than the threshold switching voltage for the device causes the device to switch into a full conductive mode. In a P-channel enhancement type of insulated gate field effect transistor, the most positive electrode is normally referred to as the source and the most negative the drain. In order to turn a bilateral insulated gate field effect transistor to the "on" state it is necessary to make the gate more negative than the source by at least the threshold voltage. This threshold voltage is normally in the neighborhood of 2 volts. In order to turn the device "off", it is necessary to connect the gate of the device to the substrate electrode of the device which for all practical purposes shorts the gate to the source.

The switching characteristics of the bilateral insulated gate field effect transistor are such that some unusual switching circuitry has been developed. The referenced co-pending application discloses a field effect transistor device means utilizing one or more insulated gate field effect transistor type switches operated from a single power source that is generally independent of any current flow through the substrate electrode element of the field effect transistor.

SUMMARY OF THE INVENTION

The present invention is directed to the utilization of the concept developed in the referenced co-pending application. Due to the relatively small amounts of voltage and power required for the operation of a system of the type disclosed in the referenced co-pending application, the switched field effect transistor device means can be applied in a very unusual manner to a two wire temperature system wherein all of the energy required for the necessary control circuits, and for switching the field effect transistor device means themselves can be obtained from the power being controlled from within the device itself. The present invention allows for the development of a fully electronic type of temperature control system where all of the electronics can be operated without the addition of wiring that is normally used to switch the load from an alternating current potential source.

DESCRIPTION OF THE PREFERRED EMBODIMENT

Figure 1:
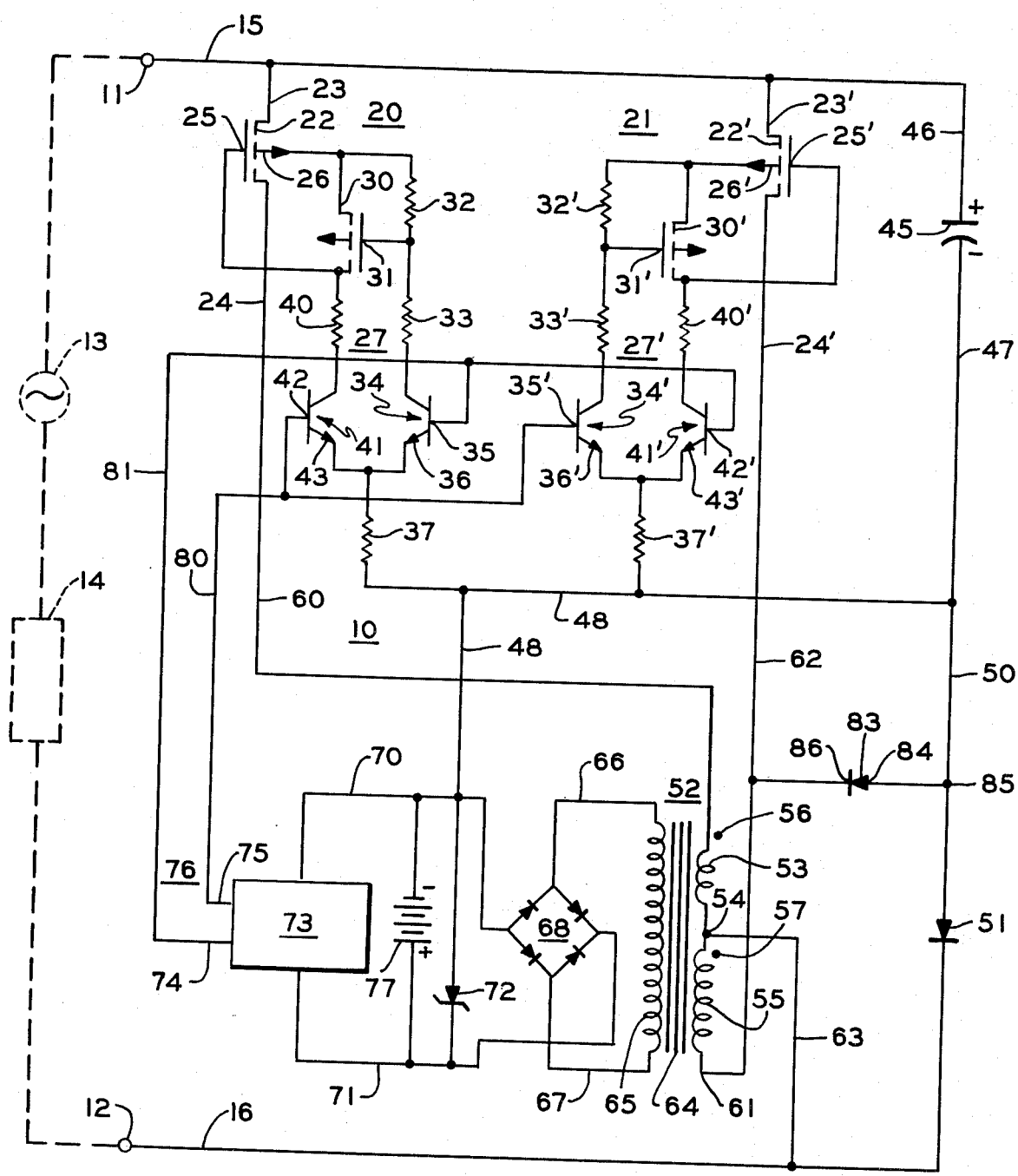
FIG. 1 is a schematic representation of an embodiment of the invention utilizing two similar field effect transistor device means.

In FIG. 1 there is disclosed a two wire temperature control circuit generally disclosed at 10 connected to a pair of terminals 11 and 12. Terminal 11 is connected to a source of alternating current 13 which in turn is connected to any type of temperature control load means 14. The load means 14 could be a relay to in turn control a heating or cooling plant, or could be the plant itself.

The terminals 11 and 12 are connected to a pair of conductors 15 and 16 which act to supply both the necessary control energy for the temperature control circuit means 10, and the switching function to control the load means 14. The temperature control circuit means 10 utilizes a pair of field effect transistor device means generally disclosed at 20 and 21. The field effect transistor device means 20 and 21 are of the type disclosed in the referenced co-pending Kompelien application. That application details the operation of the field effect transistor device means which will not be explained in great detail here. A brief description of the field effect transistor device means 20 and 21 will be provided, however, for continuity of this disclosure. The field effect transistor device means 20 includes a source—drain channel means 22 that is the load carrying portion of the field effect transistor device means 20. The source—channel means 22 is connected by conductor 23 to the conductor 15 and to an output conductor or output means 24. The field effect transistor device means 20 further has a gate means 25 and a substrate electrode means 26. The gate means 25 and electrode substrate means 26 are connected generally to an input switching circuit means 27 that is used to control the field effect transistor device means 20. This control is accomplished by a field effect transistor 30 that is connected between the gate means 25 and the substrate electrode means 26. The field effect transistor 30 has a gate 31 that is connected by a resistor 32 to the substrate electrode means 26. Resistor 32 is connected by a further resistor 33 to a transistor generally disclosed at 34. The transistor 34 has a base 35 which is used to control current flow through an emitter 36 to a further resistor 37. The input switching circuit means 27 is completed by a resistor 40 that is connected to a transistor 41 that has a base 42 and an emitter 43. The emitter 43 is connected in common with resistor 37. The elements described to this point complete the input switching circuit means 27 for the field effect transistor device means 20.

Very briefly, if the transistor 34 is conducting, the transistor 41 is kept off by a circuit which will be subsequently described. With the transistor 34 conducting, a voltage drop occurs across the resistor 32 which applies a negative voltage to the gate 31 of the field effect transistor 30 to cause it to conduct. The conduction of current through the field effect transistor 30 effectively shorts the gate means 25 and the substrate electrode means 26 of the field effect transistor device means 20 and turns the field effect transistor device means 20 to an "off" state. If the operation of the transistors 34 and 41 are reversed, that is transistor 34 is caused to stop conducting while transistor 41 conducts, the field effect transistor 30 ceases to conduct and the gate means 25 of the field effect transistor device means 20 is connected through the resistor 40 and the transistor 41 along with the resistor 37 to a source of power which applies a negative potential at the gate means 25 with respect to the source—drain channel means 22 thereby causing the field effect transistor device means 20 to conduct. As can thus be seen, the field effect transistor device means 20 can be operated as a switch between conductive and a non-conductive states. As was previously indicated, complete details of operation of this type of switch arrangement are not part of the present invention, but have been disclosed in the background of the invention or in the referenced co-pending application.

The field effect transistor device means 21 is structured identically to the field effect transistor device means 20 and includes a gate means 25', a source—drain channel means 22', a conductor 23', and has an output means 24'. The field effect transistor device means 21 further has a substrate electrode means 26' which is connected to a resistor 32' and a field effect transistor 30'. The field effect transistor 30' has a gate 31' which is connected to a resistor 33'. The field effect transistor device means 21 has an input switching circuit means 27' which includes the transistor 34' and 41', along with their respective bases 35' and 42'. The transistor 34' has an emitter 36' while the transistor 42' has an emitter 43' which are both connected to a common resistor 37'. The transistor 41' is connected to the field effect transistor 30' by the resistor 40'. The field effect transistor device means 21 is identical to the field effect transistor device means 20 and has been similarly numbered except for the reference to the prime to differentiate between the two circuits.

A voltage source for control of the field effect transistor device means 20 and 21 is provided by connecting an energy storage means or capacitor 45 to the conductor 15 by a conductor 46 to provide the positive terminal of the energy storage means 45. The negative terminal is connected by a conductor 47 to a common conductor 48 for the temperature control circuit 10. The conductor 47 is further connected to a conductor 50 and a rectifier means 51 that in turn is connected to the conductor 16. During the "off" state operation of the control circuit means 10, the capacitor or energy storage means 45 is charged through the circuit just described. During the "on" state an additional circuit (to be described) provides the necessary control voltage to operate the field effect transistor device means 20 and 21.

The output means 24 and 24' for the field effect transistor device means 20 and 21 are connected through an unusual type of transformer means generally disclosed at 52. The transformer means 52 has three winding means. The first winding means 53 is a low impedance type of current winding which is connected at 54 to a second winding 55 which is a high impedance primary winding for the transformer means 52. The transformer winding means 53 and 55 are connected together at 54 with additive polarities as indicated by the dots 56 and 57. It will be noted that one end of the low impedance primary winding means 53 is connected by a conductor 60 to the output means 24 of the field effect transistor device means 20. An end 61 of the high impedance primary winding means 55 is connected by a conductor 62 to the output means 24' of the field effect transistor device means 21. To complete the primary connection for the transformer means 52, a further connection 63 is provided between the junction 54 and the conductor 16.

The transformer means 52, with the primary winding means 53 and 55, are magnetically coupled at 64 to a secondary winding 65 that has a pair of output conductors 66 and 67. The output conductors 66 and 67 are connected to a full wave rectifier bridge generally disclosed at 68 which forms a rectifier means for the secondary winding means 65 and provides a direct current potential on the conductors 70 and 71. The conductors 70 and 71 are connected by a zener diode 72 which regulates the direct current potential between the conductors 70 and 71. The conductors 70 and 71 are further connected to an energy storage means 77 which has been disclosed as a battery. The energy supplied by the rectifier means 68 and across the zener diode 72 can be stored in the energy storage means 77 to provide a direct current potential on the conductors 70 and 71 which are in turn supplied to a temperature responsive control means generally disclosed at 73. The temperature responsive control means 73 can be of many different types. The only requirements for the temperature responsive control means 73 is that it provide a bistable "on" or "off" output signal which in this case is provided by a pair of differentially energized or controlled output means 74 and 75 which act as a general output means 76 of the temperature responsive control means 73. The temperature responsive control means 73 could be a temperature responsive resistor in a bridge which in turn operates through a differential amplifier to provide a differential set of signals at the output means 74 and 75. It is apparent that any number of arrangements can be provided wherein the means 74, for example, can be a positive potential while the output on the means 75 is either zero or a negative potential. The reverse then would occur when the temperature responsive control means operated. The temperature responsive control means 73 could have a digital output type of signal wherein an analog temperature signal is converted to a digital output and 1's or 0's could be appearing on the output means 74 and 75 depending upon the state of the temperature control means 73. The only requirement is that the output means 76 be differentially operated.

The output means 75 is connected by a conductor 80 to the base 42 of transistor 41 and to the base 35' of the transistor 34'. The output means 74 is connected by a conductor 81 to the base 35 of the transistor 34 and to the base 42' of the transistor 41'. It can thus be seen that the two input switching circuit means 27 and 27' are differentially controlled to in turn control the field effect transistor device means 20 and 21. That is, when the field effect transistor device means 20 is conducting, the field effect transistor device 21 is in an "off" state. The reverse or differential of this is true when the signals on conductors 80 and 81 are reversed.

The present circuitry is completed by the addition of one further rectifier means 83 which has its anode 84 connected to a common node 85 between the energy storage means 45 and the rectifier means 51. The rectifier means 83 has a cathode connection at 86 which connects the rectifier means 83 to the conductor 62. The rectifier means 83 provides a charging path for the energy storage means 45 in the "on" state that is unique and relies on the characteristics of the three windings of transformer means 52.

It will be noted that in the disclosure of FIG. 1, that transistors 35, 42, 35', and 41' were disclosed in the input switching circuit means 27 and 27'. The transistors could be replaced by field effect transistors as has been disclosed in the co-pending Kompelien application. The substitution of field effect transistors for the transistors allow for integration of the entire field effect transistor device means thereby simplifying and cost reducing the device. Transistors have been disclosed for simplicity of explanation of operation, which will be provided below.

OPERATION OF FIG. 1

In the operation of FIG. 1 it is intially assumed that the system has been inoperative and that no voltages exist in the device except at battery 77. Upon connection of the terminals 11 and 12 to the alternating current source means 13 and the load 14, current is drawn through the conductor 15 to charge the energy storage means capacitor 45 through the diode 51 with responsive circuit 73 in an "off" state. At this same time the battery 77 has a normal potential. Upon a potential being provided by the energy storage means or capacitor 45 to the field effect transistor device means 20 and 21, the device means 20 and 21 will take on differential operating conditions. If it is assumed that the temperature responsive control circuit means 73 is calling for the energization of the load 14, the field effect transistor device means 20 will have to be in a conductive or "on" state. In order to be in a conductive state the transistor 41 would be "on". In order for this to be accomplished there is a potential on the conductor 80 from the output means 76 of the temperature responsive control means 73. Due to the differential nature of the temperature responsive control means 73, there is little or no voltage available on conductor 81 which in turn is connected to the transistors 34 and 42'. Since there is a potential available on conductor 80, the transistor 34' is also driven into conduction along with the transistor 41. The conduction of transistor 34' develops a potential across the resistor 32' which causes the field effect transistor device means 21 to be deenergized or in an "off" state.

With current flowing through the field effect transistor device means 20, the output means 24 has a current flow that flows through the low impedance primary winding means 53 of the transformer means 52 to the conductor 63 and to the terminal 12. The low impedance transformer winding means 53 is a current type transformer winding and current flowing through the winding provides a voltage in the secondary transformer winding means 65 that is rectified and provided as a voltage at conductors 70 and 71 to charge the battery 77. The voltage on the battery 77 is used to power the temperature responsive control means 73. It can thus be seen that as long as the field effect transistor device means 20 is conductive that the current flowing in the low impedance transformer winding means 53 will keep the battery 77 charged. Also, with current in the low impedance winding, winding 55 acts as a secondary to provide charging current through rectifier 83 for energy storage means 45 which maintains the power switch 20 gate drive voltage.

Once the need for the operation of load 14 has been satisfied and the temperature responsive control means 73 switches, a potential appeared on conductor 81 and the potential on conductor 80 drops. The potential on conductor 81 drives the transistors 34 and 41' into conduction and removes the transistors 41 and 34' from conduction. This causes the field effect transistor device means 20 to cease conducting and drives the field effect transistor device means 21 into conduction. The conduction through the field effect transistor device means 21 to the output means 24' appears as a current that flows through the conductor 62 to the high impedance transformer winding 55, (now acting as a primary) to the common conductor 63, and the terminal 12. Winding means 55 provides a substantial voltage drop to current flow (since it is a relatively high impedance) and therefore the voltage at conductor 15 stays relatively high. With a relatively high voltage at the conductor 15, the energy storage means or capacitor 45 is able to draw current to be recharged through the diode 51. The voltage appearing across the primary winding means 55 provides a voltage for the secondary winding means 65, and that voltage is in turn provided as a voltage on conductors 70 and 71 to keep the battery 77 fully charged. It will be noted that since a substantial voltage drop appears across the primary transformer winding 55 that little or no voltage drop can appear across the load 14. While the load 14 draws a slight current, this current is below its operating level. If for example the load 14 were a relay, a slight current through the load 14 would have little or no effect to energize that load means. If the load means 14 were a load such as a heating element, a very slight current through it that is necessary to energize the electronics is also insignificant.

One rather critical statement of operation has yet to be described. It will be noted that when the field effect transistor device means 20 is in a conductive state to energize the load means 14, the voltage drop between the conductors 15 and 16 substantially disappears. This disappearance of the voltage, if the load means 14 were on for a long period of time, would allow the capacitor or energy storage means 45 to become discharged and the system would fail in an inoperative mode. In order to overcome this, the additional rectifier means or diode 83 has been added. It will be noted that as the field effect transistor device means 20 conducts that there is always a potential generated across the primary winding means 53. Since the primary winding means 53 is magnetically coupled to the primary winding means 55, a voltage will occur across the winding means 55. A charging circuit can be traced for the energy storage means or capacitor 45 from the conductor 47, through the diode 83, through the winding means 55, through the winding means 53, and back through the source—drain channel means 22 of the field effect transistor device means 20 to the conductor 46. The capacitor or energy storage means 45 draws a small amount of current through the rectifier means or diode 83 on the appropriate half cycle of the applied alternating current potential 13. Since this energy is quite small, the charging current can flow through the same circuit as the load current and thereby provides a unique charging circuit so that the temperature control circuit means 10 will always have the necessary energy supplied to both the energy storage means 45 and the energy storage means 77 regardless of whether the responsive control is in the "on" or "off" state or field effect transistor device means 20 or 21 is in operation. Without the additional circuitry involving the rectifier means 83 and the ability of the energy storage means 45 to receive a charge through the primary windings 53 and 55 of the transformer means 52, the capacitor 45 could become discharged in a long cycle of the load 14 being "on". This would cause the temperature control circuit means 10 to lose control and would provide an inoperative type of device.

Figure 2:
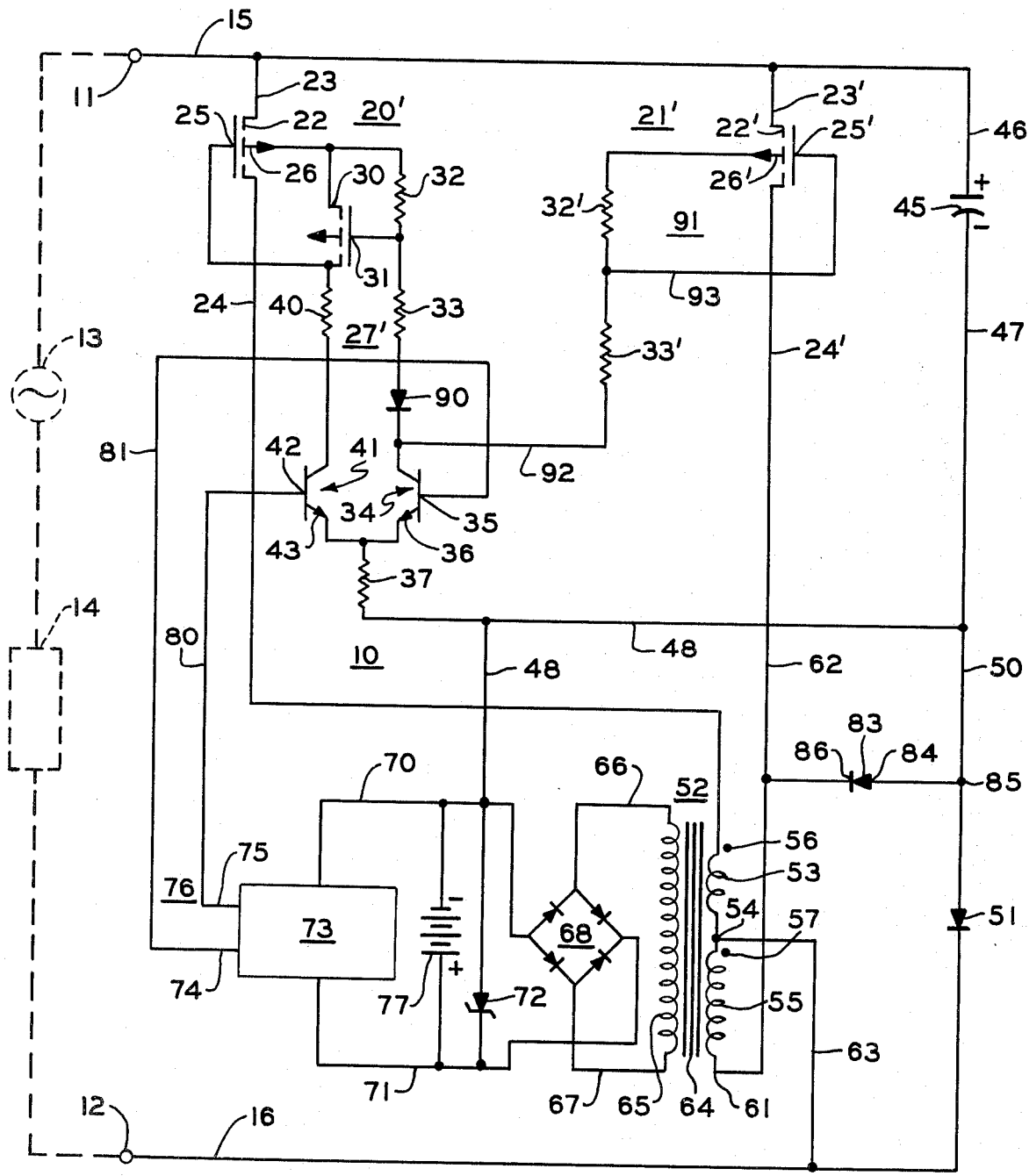
FIG. 2 is a schematic representation of a modified form of the invention of FIG. 1.

In FIG. 2 a simplified circuit has been disclosed. The same elements will be referenced by the same reference numerals and only a brief description will be provided of the difference. A field effect transistor device means 20' has been disclosed which is very similar to the field effect transistor device means 20 except for the addition of a diode 90 in series with the resistor 33 and the transistor 34. The diode 90 prevents a reverse current flow in an input switching circuit means 27' when the modified input switching circuit means 91 of the field effect transistor device means 21' is utilized. It will be noted that the input switching circuit means 27' is again connected by the conductors 81 and 80 to the transistors 34 and 41. It will be further noted that the connections 80 and 81 terminate at the bases 35 and 42 of the transistors 34 and 41 in the input switching circuit means 27' without being directly connected to the input switching circuit means 91 of the field effect transistor device means 21'. This is the major difference between FIG. 1 and FIG. 2. In FIG. 2 the input switching circuit means 91 is completed by the resistor 33' and by a conductor 92 which is connected directly to the transistor 35 where it is joined with the diode 90. The operation of the transistor 34 controls the input switching circuit means 91 of the field effect transistor device means 21' and is the only difference between the disclosures of FIG. 1 and FIG. 2. This allows for the elimination of elements thereby simplifying the device and reducing its cost. Field effect switches 21 and 21' can be of a much lower current capability than 20 or 20' since they only need to provide circuit operating energy and are not needed to switch the load current.

OPERATION OF FIG. 2

The operations of FIGS. 1 and 2 are very similar and only the operation of the field effect transistor device means 20' and 21' will be described. It will be noted that when a signal is available on conductor 81 to drive the transistor 34 into conduction thereby generating a voltage drop across the resistor 32', the field effect transistor 30 conducts thereby turning the field effect transistor device means 20' to an "off" state. The conduction of the transistor 34 effectively drives the gate means 25 of the field effect transistor device means 21' toward the negative potential of the energy storage means or capacitor 45 thereby providing a negative potential which turns the field effect transistor device means 21' to an "on" state.

Upon reversal of the signals on conductors 80 and 81, the transistor 34 is turned "off" and the transistor 41 is caused to conduct. The conduction of the transistor 41 causes the field effect transistor device means 20' to start conducting but removes the negative potential from the conductor 92 since the transistor 34 is not conducting. Without a negative potential on conductor 92 the gate means 25' of the field effect transistor device means 21' is effectively shorted to the substrate electrode means 26' by the conductor 93 and resistor 32'. This shorted condition causes a field effect transistor device means 21' to be in an "off" state.

It can thus be seen that by the simple connection of the field effect transistor device means 21' to the modified input switching circuit means 27' of the field effect transistor device means 20' that both the field effect transistor device means 20' and 21' can be controlled by a single pair of transistors 34 and 41. The balance of the operation of the circuitry as relates to the charging of the energy storage means 72 and 45 remains unchanged.

The disclosures of FIG. 1 and FIG. 2 show modifications in the input switching circuit means of the two field effect transistor device means used for control in the present temperature control circuit means 10. As has been previously noted, the transistors used for switching could be replaced by field effect transistors in the event that the device is in a wholly integrated form. Other modifications to the circuitry will become obvious to one skilled in the art and the applicant wishes to be limited in his invention solely by the scope of the appended claims.

The embodiments of the invention in which an exclusive property or right is claimed are defined as follows:

1. A temperature control circuit adapted to control field effect transistor device means to switch an alternating current potential to operate temperature control load means, including: field effect transistor device means including input switching circuit means and output means with said field effect transistor device means being capable of being switched between conductive and non-conductive states; transformer means including low impedance primary winding means, high impedance primary winding means, and secondary winding means with said three winding means being magnetically coupled; said field effect device output means and said low impedance winding means adapted to be connected in a series circuit with said load means and said source of alternating current potential; energy storage means and series connected rectifier means connected in parallel with said field effect transistor device output means and said low impedance transformer winding means; second field effect transistor device means including input switching circuit means and output means with said second field effect transistor device means being capable of being switched between conductive and non-conductive states; said second field effect transistor device output means in series circuit with said high impedance primary transformer winding means connected in parallel circuit with said energy storage means and said rectifier means; second rectifier means connected from said energy storage means to said second field effect transistor device output means; power supply means having an input connected to said transformer secondary winding to receive power therefrom and having direct current potential output means; temperature responsive control means having an input connected to said direct current potential output means to power said temperature responsive control means; and temperature responsive control output means connected to both of said field effect transistor device means input switching circuit means to differentially control said field effect transistor device means.

2. A temperature control circuit as described in claim 1 wherein said low impedance primary winding means is a current type transformer winding; said high impedance primary winding means is a voltage type transformer winding; and said current and voltage windings are connected with series additive polarities.

3. A temperature control circuit as described in claim 2 wherein said energy storage means is a capacitor; and said two rectifier means are individual diodes having anode terminals connected in common to said capacitor.

4. A temperature control circuit as described in claim 3 wherein said power supply means includes power rectifier means and a battery; said battery being charged by current flow from said power rectifier means.

5. A temperature control circuit as described in claim 4 wherein said power rectifier means includes a full wave rectifier bridge having an output voltage connected in parallel by a zener diode to provide a regulated voltage.

6. A temperature control circuit as described in claim 3 wherein said input switching circuit means for said field effect transistor device means each having differentially operated solid state switches.

7. A temperature control circuit as described in claim 6 wherein said power supply means includes power rectifier means and a battery; said battery being charged by current flow from said power rectifier means.

8. A temperature control circuit as described in claim 7 wherein said power rectifier means includes a full wave rectifier bridge whose output is connected in parallel with a zener diode to provide a regulated voltage.

9. A temperature control circuit as described in claim 3 wherein said input switching circuit means for said field effect transistor device means have a common pair of solid state switches to differentially operate said field effect transistor device means.

10. A temperature control circuit as described in claim 9 wherein said power supply means includes power rectifier means and a battery; said battery being charged by current flow from said power rectifier means.

* * * * *